United States Patent
Richardson

(10) Patent No.: US 11,359,257 B2
(45) Date of Patent: Jun. 14, 2022

(54) SYSTEM AND METHOD FOR LIQUID-ORGANIC PARTICLE SEPARATION

(71) Applicant: FREEPORT MINERALS CORPORATION, Phoenix, AZ (US)

(72) Inventor: Steven Richardson, Thatcher, AZ (US)

(73) Assignee: FREEPORT MINERALS CORPORATION, Phoenix, AZ (US)

(*) Notice: Subject to any disclaimer, the term of this patent is extended or adjusted under 35 U.S.C. 154(b) by 7 days.

(21) Appl. No.: 17/114,075

(22) Filed: Dec. 7, 2020

(65) Prior Publication Data
US 2021/0087653 A1    Mar. 25, 2021

Related U.S. Application Data

(63) Continuation of application No. 16/534,491, filed on Aug. 7, 2019, now Pat. No. 10,858,721.

(51) Int. Cl.
| | | |
|---|---|---|
| *C22B 3/22* | (2006.01) | |
| *B01D 17/02* | (2006.01) | |
| *C25C 1/12* | (2006.01) | |
| *B01D 21/00* | (2006.01) | |

(52) U.S. Cl.
CPC ........... *C22B 3/22* (2013.01); *B01D 17/0211* (2013.01); *B01D 17/0214* (2013.01); *B01D 21/0042* (2013.01); *B01D 21/0048* (2013.01); *B01D 2257/70* (2013.01); *C25C 1/12* (2013.01)

(58) Field of Classification Search
CPC ............ B01D 11/0453; B01D 17/0211; B01D 17/0214; B01D 21/0042; B01D 21/0048; B01D 2257/70; C22B 3/02; C22B 3/22; C25C 1/12
See application file for complete search history.

(56) References Cited

U.S. PATENT DOCUMENTS

| | | |
|---|---|---|
| 5,066,407 A | 11/1991 | Furlow |
| 5,766,484 A | 6/1998 | Petit et al. |
| 7,297,284 B2 | 11/2007 | Owen et al. |
| 7,328,809 B2 | 2/2008 | Gigas et al. |
| 8,915,380 B2 | 12/2014 | Sowerby et al. |
| 9,308,473 B2 | 4/2016 | Haywood et al. |
| 10,344,466 B2 | 7/2019 | Kent |
| 10,858,721 B1 | 12/2020 | Richardson |

FOREIGN PATENT DOCUMENTS

| | | |
|---|---|---|
| KR | 101651081 | 8/2016 |
| KR | 101764065 | 8/2017 |

OTHER PUBLICATIONS

Cross Section of Typical Grease Interceptor—https://www.researchgate.net/figure/245301083_fig1_Fig-1-Cross-section-of-typical-grease-interceptor—Nov. 13, 2017.

(Continued)

*Primary Examiner* — Terry K Cecil
(74) *Attorney, Agent, or Firm* — Snell & Wilmer L.L.P.

(57) ABSTRACT

The present invention provides a method and system for separating a liquid from organic particles. The mixer-settler extraction cell includes a flow distributor. The flow distributor comprises a chevron-shaped series of welded plates, which separates the incoming flow stream of liquid and organic particles from one another.

18 Claims, 7 Drawing Sheets

(56) References Cited

OTHER PUBLICATIONS

Oil Water Separator—Ellis Wastewater—Separates Oils From Liquids http://www.elliswastewater.com/products/oil-water-separator—Nov. 13, 2017.

Peak Performance in Oil-water Separator—http://psinternational.com/—Nov. 13, 2017.

"Advancements in Organic Entrainment Recovery"—2018 Hydromet Summit—Presenters: Steven Richardson and Kent Detrick—Aug. 8, 2018.

"Advancements in Organic Entrainment Recovery"—2018 Hydromet Summit—Presenters: Steven Richardson and Kent Detrick—Aug. 8, 2018—Screenshots from presentation video—Substantial Accumulation of Organic Droplets in RICO Device RICO 1—Droplets Edge and Under.

"Advancements in Organic Entrainment Recovery"—2018 Hydromet Summit—Presenters: Steven Richardson and Kent Detrick—Aug. 8, 2018—Screenshots from presentation video—Organic Droplets Rising up from RICO Device to Gunk Layer—RICO 3—Org Drop Rise Corner.

"Advancements in Organic Entrainment Recovery"—2018 Hydromet Summit—Presenters: Steven Richardson and Kent Detrick—Aug. 8, 2018—Screenshots from presentation video—RICO 4—Corner Burst Rise.

Notice of Allowance, Examiner's Interview Summary and Amendment for corresponding U.S. Appl. No. 16/534,491, dated Aug. 13, 2020.

SYSTEM AND METHOD FOR LIQUID-ORGANIC PARTICLE SEPARATION

CROSS REFERENCE TO RELATED APPLICATIONS

This application is a continuation of and claims priority to U.S. patent application Ser. No. 16/534,491, entitled "SYSTEM AND METHOD FOR LIQUID-ORGANIC PARTICLE SEPARATION," which was filed on Aug. 7, 2019. The aforementioned application is hereby incorporated by reference herein in its entirety.

FIELD OF INVENTION

The invention generally relates to systems and methods for separating components of a mixture of liquids and organic particles. More particularly, the invention relates to systems and methods for reducing entrained organic particles in the aqueous flow stream.

BACKGROUND OF THE INVENTION

Solvent extraction systems are often utilized to extract metal complexes from a mixture of liquids. Mixer-settlers are one extraction circuit in which compounds separate by density. Entering the mixer-settler, a pregnant leach solution and extractant mix, and metal complexes are extracted to separate the metal into a loaded organic stream. A stripping solution may then be added to the loaded organic stream, and the metal complexes bind to the stripping solution. Within the mixer-settler, organic particles are less dense than the aqueous flow stream and rise above the aqueous flow stream's higher density. Upon separation of the organic particles from the aqueous flow stream, the organic particles typically join a larger organic launder layer.

However, when the flow stream enters the mixer-settler at a high velocity, organic particles may become entrained in the aqueous flow stream, and never join the larger organic layer. This results in multiple issues, including the potential for unwanted impurities being included in the electrowinning process and decreasing the purity of the copper cathode. Organic particles may also contribute to plugging pipework in the mixer-settler and in the leaching piping network. The organic can cause buildup in the emitters, and also in the electrolyte filters where entrained organic is removed from the rich electrolyte. An efficient system and method of reducing entrained organic particles in the aqueous flow stream may prevent these potential issues.

SUMMARY OF THE INVENTION

The present disclosure provides an improved system and method for reducing entrained organic particles in an aqueous flow stream. Using the systems and methods of the present disclosure, a dispersion of two separable aqueous and organic components may be effectively separated. As set forth in more detail below, the improved system and method use a flow distributor, wherein the flow distributor has an apex in a settling apparatus (e.g., a settler portion of a mixer-settler) to selectively separate the aqueous flow stream from at least some of the organic particles. Once the aqueous flow stream containing particles reaches the flow distributor in the settling apparatus, it is believed that the less dense organic particles may separate from the aqueous flow stream and float upward. It is believed that the selective separation of organic particles from the aqueous flow stream reduces entrainment in the aqueous flow stream.

In accordance with various embodiments of the disclosure, a standalone flow distributor comprising an inverted chevron-shaped plate is attached to the mixer-settler. The aqueous flow stream and organic particles enter the mixer-settler from one end at a certain velocity and move unilaterally in one direction. From this point, the less dense organic particles may begin to rise above the aqueous flow stream into an isolated chamber of the mixer-settler above the plate. Other organic particles may still be entrained in the aqueous flow stream. Most of the aqueous flow stream travels underneath the plate. A weir is attached to the other end of the plate, wherein a ledge of the weir begins prior to the end of the plate and creates an opening underneath the plate and the ledge for organic particles to travel upward. The ledge is attached to the vertical weir, which directs organic particles to accumulate and discharge at the top of the weir and into the fluid top surface of an organic launder layer. The aqueous flow stream continues to travel underneath the plate and upward, after which the aqueous flow stream discharges into aqueous launder.

In another exemplary process for reducing entrainment from the aqueous flow stream, a standalone flow distributor comprising a chevron-shaped plate is attached to the mixer-settler. An additional shielded front edge may be attached to the chevron-shaped plate. The aqueous flow stream and organic particles enter the mixer-settler from one end at a certain velocity and move unilaterally in one direction. The flow stream hits the shielded front edge, thereby causing a decrease in velocity of the flow stream. The shielded front edge may cause organic particles to rise above the shielded edge into an isolated chamber of the mixer-settler above the plate. Other organic particles may still be entrained in the aqueous flow stream. Most of the aqueous flow stream travels underneath the plate. A weir is attached to the other end of the plate, wherein organic particles are directed upward and may accumulate and discharge at the top of the weir and into the fluid top surface of the organic launder layer. The aqueous flow stream continues to travel underneath the plate and upward, after which the aqueous flow stream discharges into aqueous launder.

A mixer-settler assembly in accordance with the present disclosure comprises a vessel configured to conduct the flow of a liquid mixture and/or dispersion comprising an inbound portion, an outbound portion, and a flow distributor, wherein the flow distributor has an apex configured to point in the direction of the organic launder layer or the bottom of the mixer-settler assembly if it also comprises a shielded front edge.

BRIEF DESCRIPTION OF THE DRAWING FIGURES

The drawing figures described herein are for illustration purposes only and are not intended to limit the scope of the present disclosure in any way. The present disclosure will become more fully understood from the detailed description and the accompanying drawing figures herein, wherein.

Figure 5:
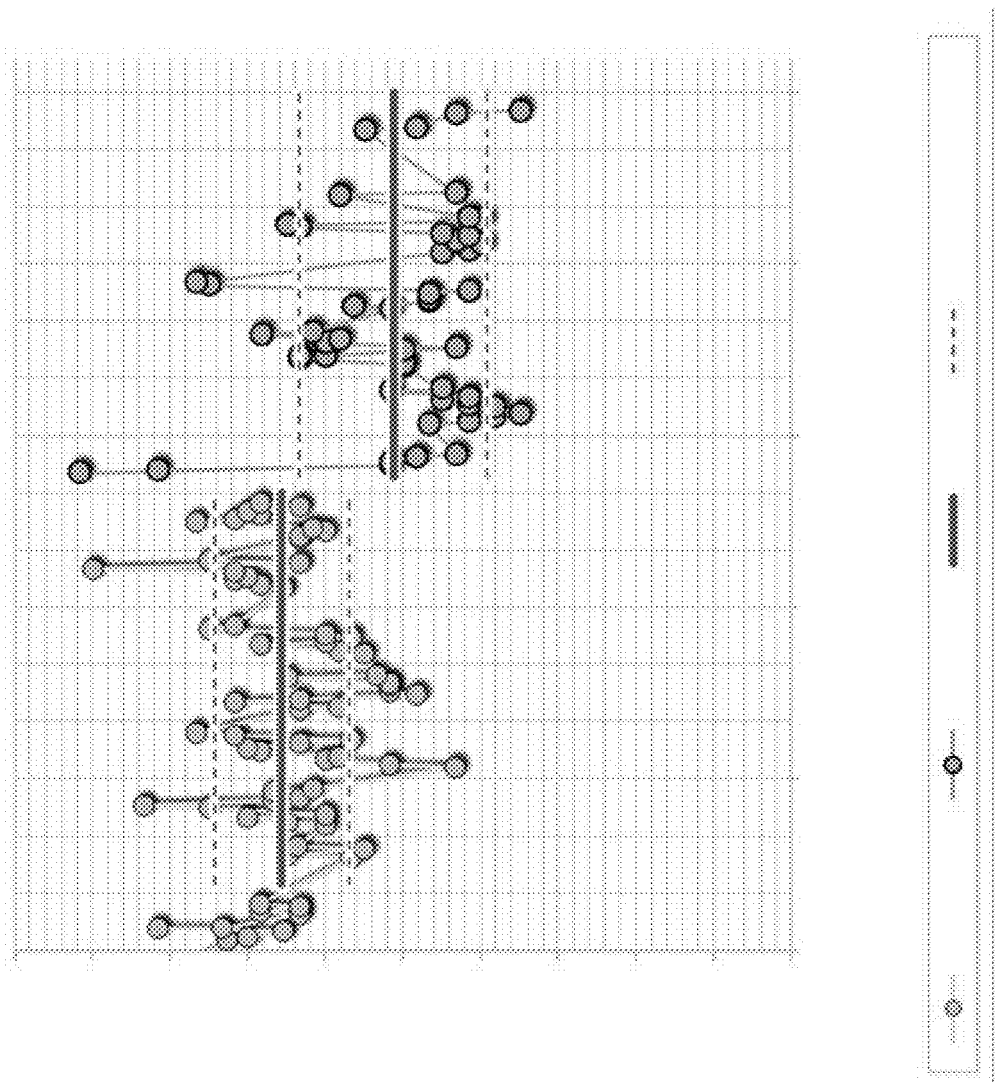
Figure 6:
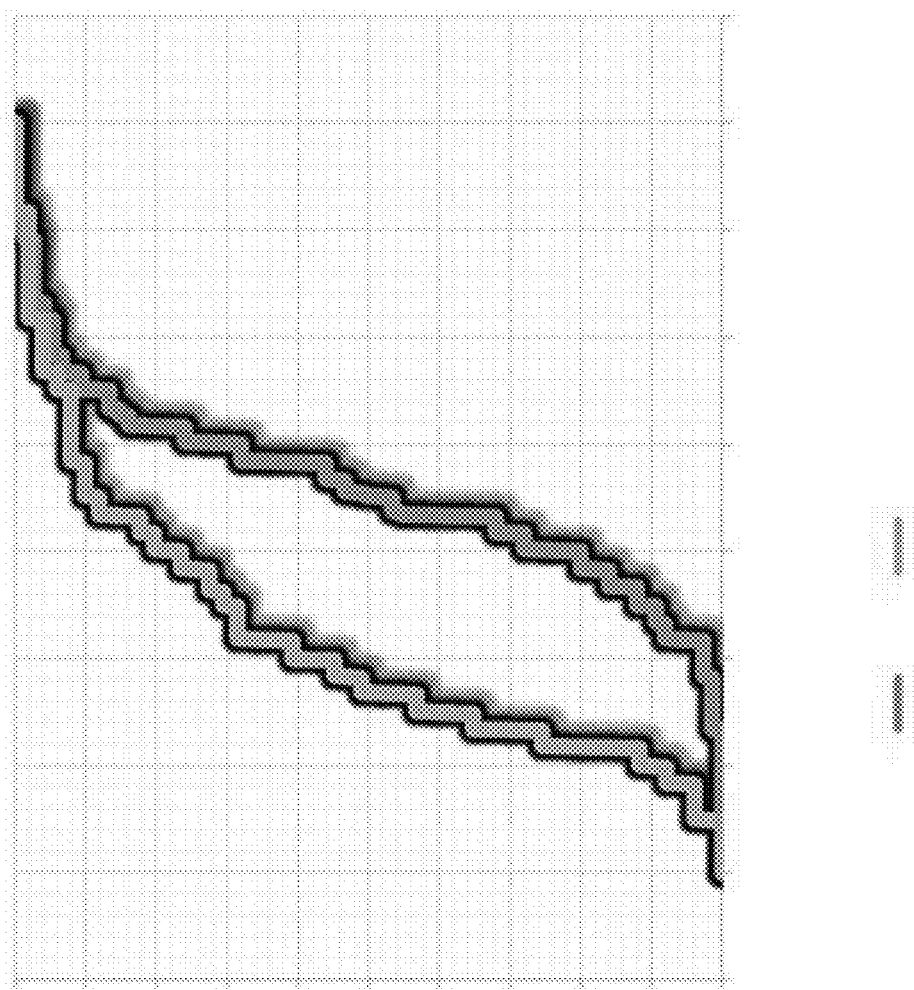

FIG. 5 illustrates experimental results comparing average organic entrainment rates over time between a mixer-settler unit without an exemplary flow distributor installed, versus a mixer-settler unit with an exemplary flow distributor installed; and FIG. 6 illustrates experimental results in an s-curve of a mixer-settler unit without an exemplary flow distributor installed, versus a mixer-settler unit with an exemplary flow distributor installed.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION

The detailed description of various embodiments herein makes reference to the accompanying drawing figures, which show various embodiments and implementations thereof by way of illustration and best mode, and not of limitation. While these embodiments are described in sufficient detail to enable those skilled in the art to practice the embodiments, it should be understood that other embodiments may be realized and that mechanical and other changes may be made without departing from the spirit and scope of the present disclosure.

Also, any reference to attached, fixed, connected or the like may include permanent, removable, temporary, partial, full and/or any other possible attachment option. Additionally, though the various embodiments discussed herein may be carried out in the context of metal recovery, it should be understood that systems and methods disclosed herein may be incorporated into other systems to separate components of a dispersion in accordance with the present disclosure.

The various embodiments of a liquid-organic particle separation system comprise the features hereinafter described and particularly pointed out in the claims. The following description and the annexed drawing figures set forth in detail and demonstrate certain illustrative embodiments of the disclosure. However, these embodiments are indicative of but a few of the various ways in which the principles disclosed herein may be employed. Other objects, advantages and novel features will become apparent from the following detailed description when considered in conjunction with the drawing figures.

The present invention provides a system and method for improving purification and concentration of a pregnant leach solution. As set forth in more detail below, the system and method can be used to reduce the amount of entrained organic particles in an aqueous phase of hydrometallurgical metal recovery processing, and therefore can be used to increase purity of metal recovery and decrease costs associated with recovering metal from ore.

Figure 1:
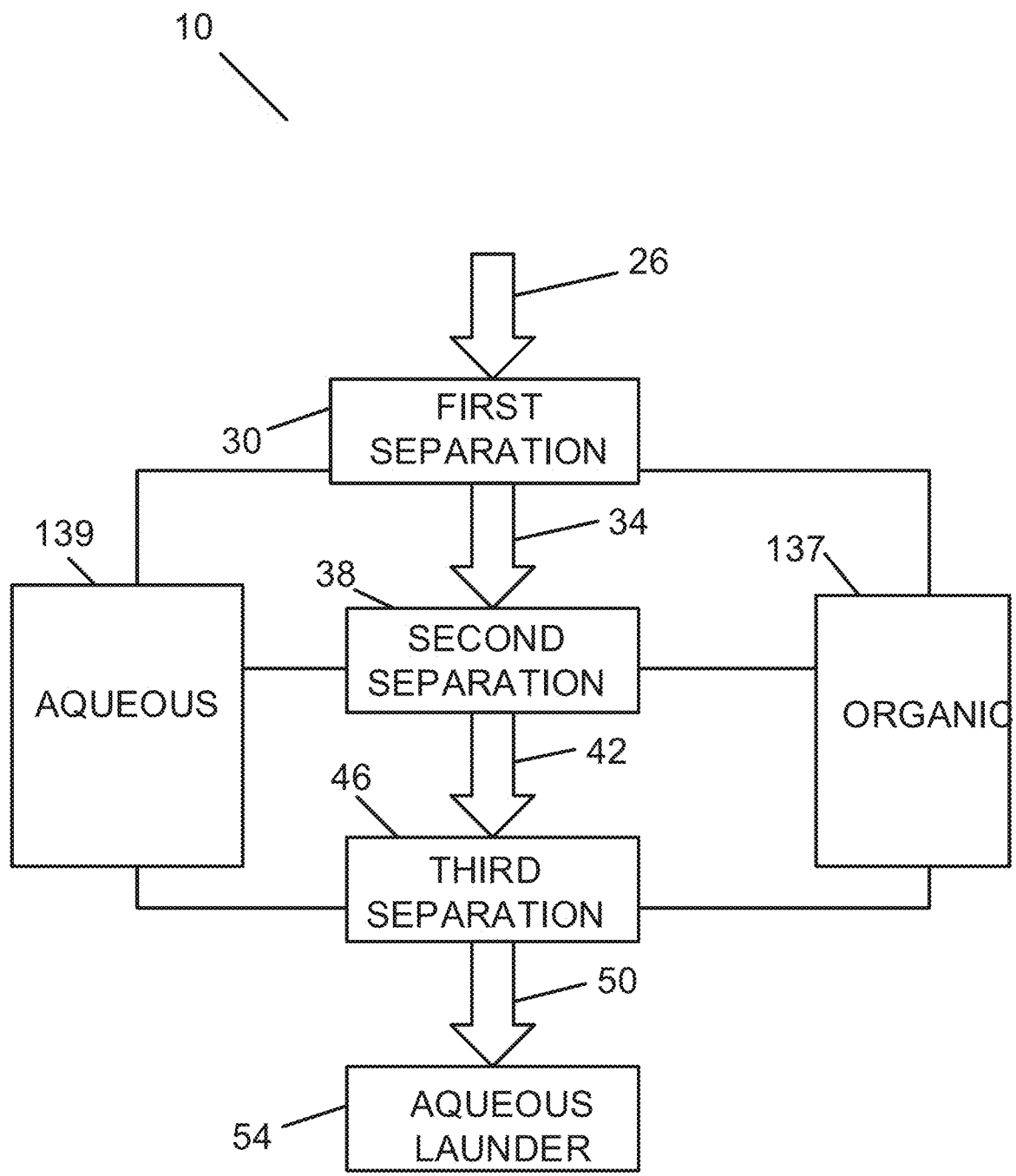
FIG. 1 illustrates a process flow of a solid-liquid separation step.

To assist in understanding the context of the present disclosure, a solid-liquid separation step 10 is configured to utilize systems and methods to separate a dispersion of aqueous solution and organic particles in accordance with the present disclosure is illustrated in FIG. 1. In the exemplary process, aqueous flow stream ("flow stream") 26 is forwarded to a first separation step 30. First separation step 30 separates flow stream 26 into organic particles 137 and aqueous solution 139. In various embodiments, separated flow stream 34 is then subjected to a second separation step 38. Second separation step 38 separates remaining organic particles 137 from aqueous solution 139. In various embodiments, separated flow stream 42 is then subjected to a third separation step 46. Third separation step 46 separates remaining organic particles 137 from aqueous solution 139. In various embodiments, separated flow stream 50 may be subjected to aqueous launder step 54 for storage of separated flow stream 50. Once separated, separated organic particles 137 may group together in one large grouping apart from separated flow stream 50. Separated flow stream 50 may comprise aqueous solution 139.

In accordance with various embodiments, solid-liquid separation step 10 comprises a mixer-settler unit 100. With initial reference to FIG. 2 and continued reference to FIG. 1, an exemplary mixer-settler unit 100 is illustrated for use in accordance with various embodiments of the invention. Mixer-settler unit 100 may be configured to reduce entrained organic particles from the aqueous flow stream in accordance with the present disclosure. In the illustrated example, flow stream 26 enters mixer-settler unit 100 at flow stream section 204. In an exemplary embodiment, flow stream 26 comprises organic particles 137 and aqueous solution 139. However, flow stream 26 may be any mixture containing at least two immiscible and separable liquids, including a dispersion and/or emulsion.

Figure 2:
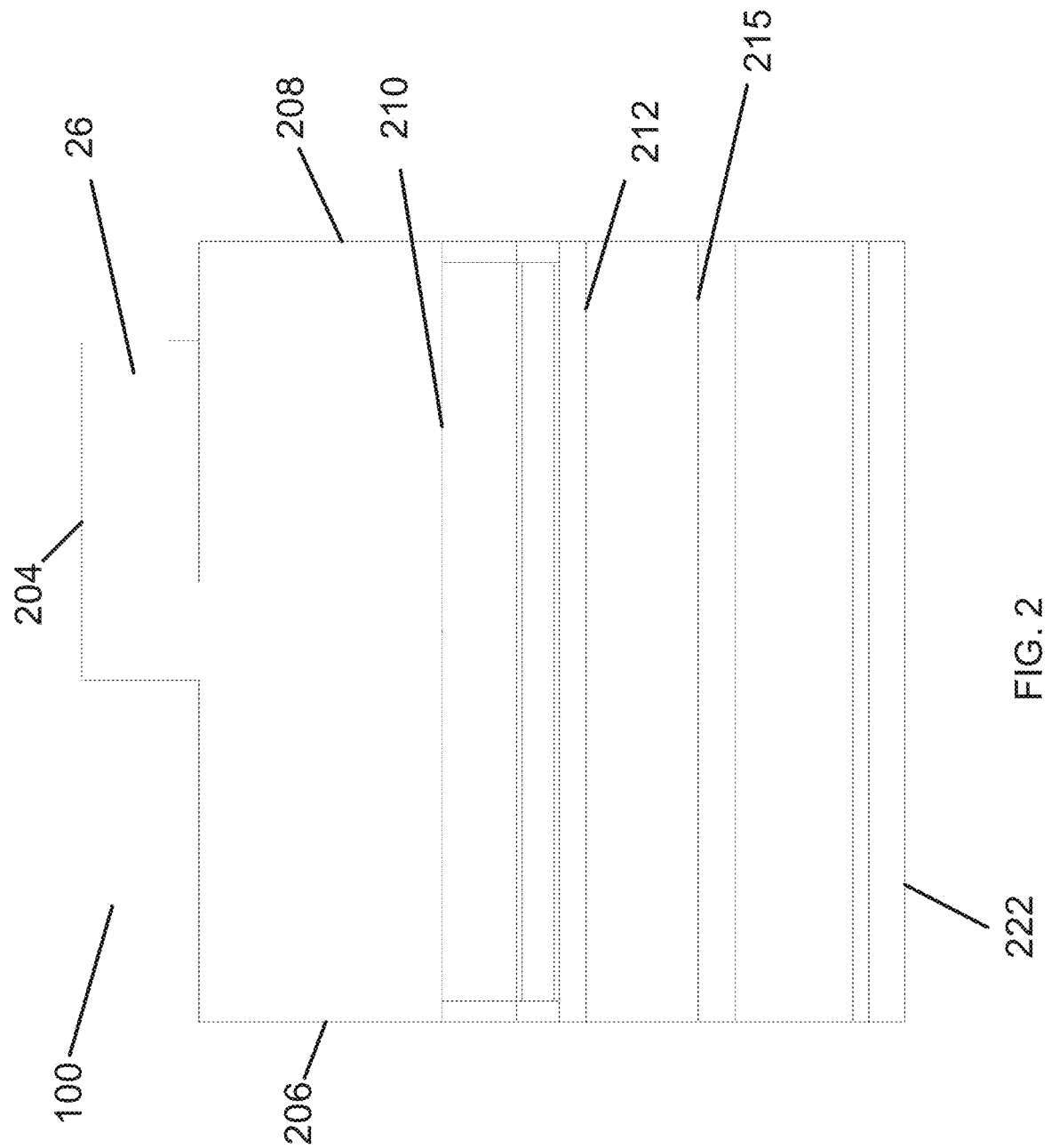
FIG. 2 illustrates a top view of an exemplary mixer-settler.

In various embodiments, mixer-settler unit 100 further comprises a perimeter wall 206 and a perimeter wall 208. Further, mixer-settler unit 100 may comprise a discharge section 222. In various exemplary embodiments, separated flow stream 50 may exit the mixer-settler unit 100 from discharge section 222. Separated flow stream 50 may exit from discharge section 222. However, it should be appreciated that any mixture may exit from discharge section 222. In accordance with an exemplary embodiment, and with continued reference to FIGS. 1 and 2, mixer-settler unit 100 further comprises a primary flow distributor 210. Mixer-settler unit 100 may further comprise a secondary flow distributor 212 and a tertiary flow distributor 215. Although FIG. 2 illustrates two additional flow distributors, the use of any number of additional flow distributors may be used to separate flow stream 26 into organic particles 137 and aqueous solution 139, as discussed herein. First separation step 30 of flow stream 26 may be performed by primary flow distributor 210. The resultant separated flow stream 34 may be further separated into remaining organic particles 137 and aqueous solution 139 in second separation step 38 by secondary flow distributor 212. The resultant separated flow stream 42 may be further separated into remaining organic particles 137 and aqueous solution 139 in third separation step 46 by tertiary flow distributor 215.

Figure 3A:
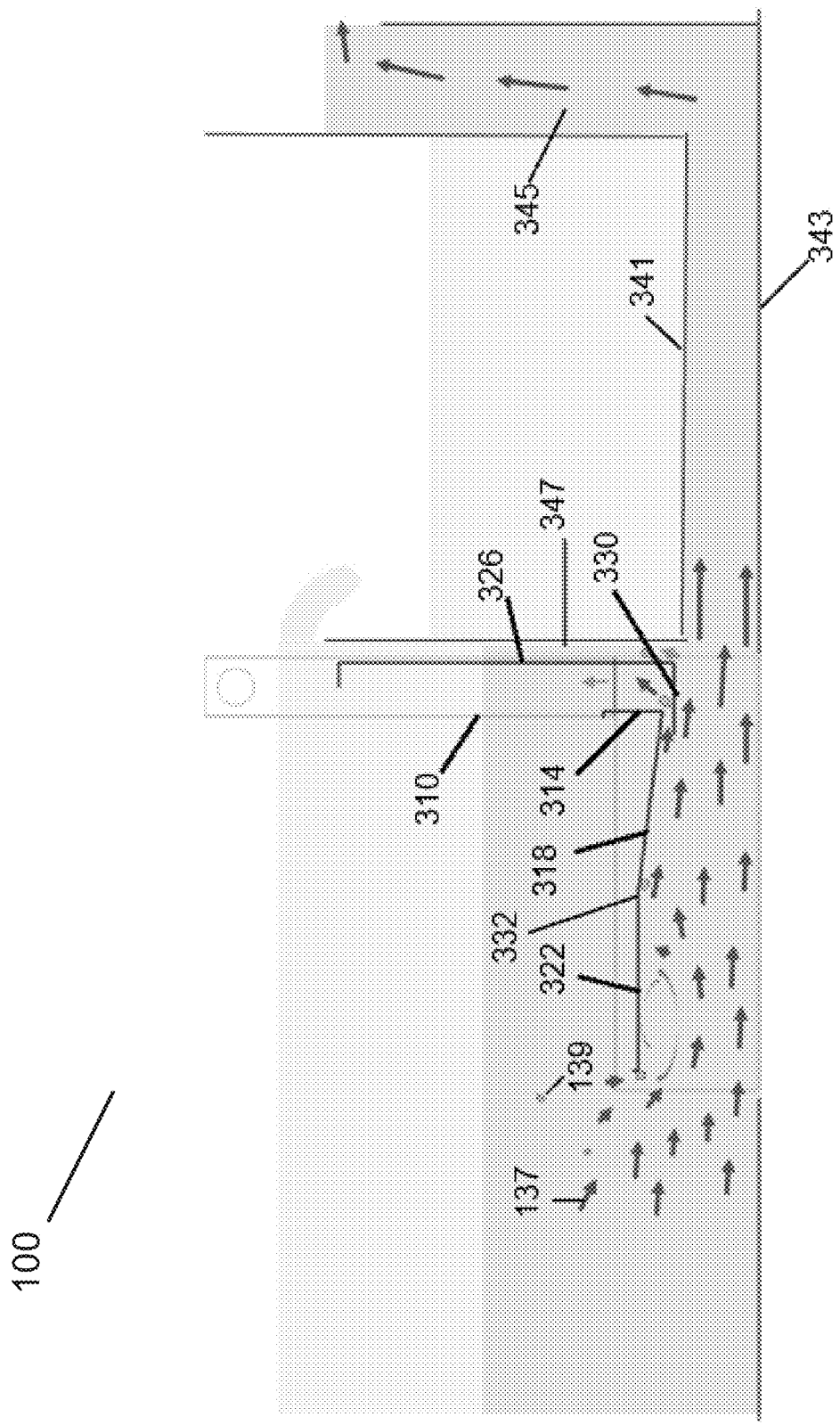
FIG. 3A illustrates an exemplary mixer-settler unit.

With reference to FIG. 3A, primary flow distributor 210 may comprise a first plate 314 coupled to a second plate 318. Second plate 318 may be coupled to a third plate 322. One end of first plate 314 may have a square edge surface. The other end of first plate 314 is coupled to one end of second plate 318, forming a substantially perpendicular angle. The end of second plate 318 not coupled to first plate 314 may be coupled to one end of third plate 322. The end of third plate 322 not coupled to second plate 318 may have a square edge surface. In a preferred embodiment, second plate 318 and third plate 322 may be angled to comprise a substantially chevron-shaped configuration with an apex 332 pointing towards the top of mixer-settler unit 100. First plate 314, second plate 318, and third plate 322 may be connected to at least one vertical support member 310. First plate 314, second plate 318, and third plate 322 may connect to each other and one another by bolts, clips, welding, or any other suitable fastener. However, any method of attachment which joins first plate 314, second plate 318, and third plate 322 to support structure 310 is in accordance with the present disclosure.

During operation of mixer-settler unit 100, flow stream 26 may move unilaterally towards primary flow distributor 210, hitting the square edge surface of third plate 322 first. The interaction between flow stream 26 and third plate 322 may cause flow stream 26 to separate organic particles 137 from aqueous solution 139. Being less dense than aqueous solution 139, organic particles 137 may float upward into a larger organic layer. Organic particles 137 may be prevented from rejoining aqueous solution 139 by primary flow distributor 210 comprising third plate 322, second plate 318 and first plate 314.

In various example embodiments, secondary flow distributor 212 may comprise a weir 326 coupled to support structure 310. A leading edge 330 may be coupled to weir 326 and form a perpendicular angle. Leading edge 330 may extend below the perpendicular angle formed by the coupling of first plate 314 and second plate 318. In various embodiments, sufficient space may be between primary flow distributor 210 and secondary flow distributor 212 to allow for organic particles 137 to pass through the space and float upward towards the larger organic layer.

With further reference to FIGS. 1 and 2, during operation of mixer-settler unit 100, separated flow stream 34 may move unilaterally towards secondary flow distributor 212, hitting leading edge 330 first. The interaction between separated flow stream 34 and leading edge 330 may cause separated flow stream 34 to separate remaining organic particles 137 from aqueous solution 139. Organic particles 137 may pass through the space formed between primary flow distributor 210 and secondary flow distributor 212 to float upwards to join the larger organic layer. Organic particles 137 may be prevented from rejoining aqueous solution 139 by secondary flow distributor 212.

In various embodiments, tertiary flow distributor 215 may comprise secondary weir 347. During operation of mixer-settler unit 100, separated flow stream 42 may move unilaterally towards tertiary flow distributor 215. Any remaining organic particles that have not already separated during the first separation step 30 and the second separation step 38 may float upward through secondary weir 347 and empty into organic launder tank 341. After passing tertiary flow distributor 215, separated flow stream 50 may comprise aqueous solution 139. Separated flow stream 50 may move unilaterally through post-flow distributor area 343. Post-flow distributor area 343 may be underneath organic launder tank 341. Separated flow stream 50 may move through post-flow distributor area 343 upwards through a tertiary weir 345. Tertiary weir 345 may empty into aqueous launder 54. However, it should be appreciated that separated flow stream 50 may empty into any location appropriate for the hydrometallurgical recovery process.

Figure 3B:
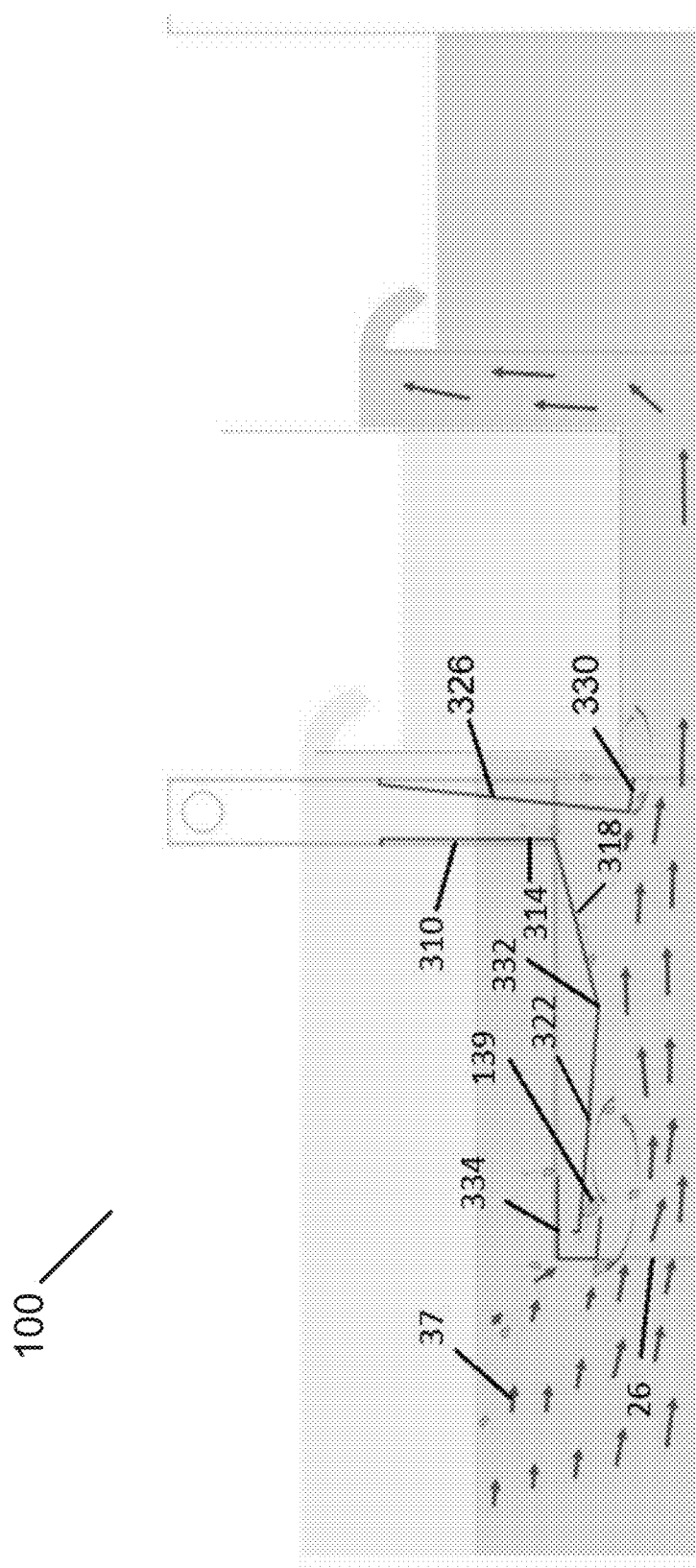
FIG. 3B illustrates an additional exemplary mixer-settler unit.

FIG. 3B illustrates an additional exemplary embodiment of mixer-settler unit 100. In various embodiments, primary flow distributor 210 may comprise a shielded front edge 334. Shielded front edge 334 may partially enclose the end of third plate 322 that may have a square edge surface. During operation of mixer-settler unit 100, flow stream 26 may move unilaterally towards primary flow distributor 210, hitting shielded front edge 334 first. The interaction between flow stream 26 and shielded front edge 334 may cause flow stream 26 to separate organic particles 137 from aqueous solution 139. Being less dense than aqueous solution 139, organic particles 137 may float upwards into the larger organic layer. Organic particles 137 may be prevented from rejoining aqueous solution 139 by primary flow distributor comprising shielded front edge 334. Shielded front edge 334 may significantly slow the flow of flow stream 26 upon the entry of flow stream 26 into mixer-settler unit 100. Due to the slow flow of flow stream 26, organic particles 137 may more easily float upwards into the larger organic layer upon interacting with shielded front edge 334.

In various embodiments, secondary flow distributor 212 may comprise first plate 314 coupled to second plate 318. Second plate 318 may be coupled to third plate 322. The end of second plate 318 not coupled to first plate 314 may be coupled to one end of third plate 322. The end of third plate 322 not coupled to second plate 318 may have a square edge surface. In a preferred embodiment, second plate 318 and third plate 322 may be angled to comprise a substantially chevron-shaped configuration with an apex 332 pointing towards the bottom of mixer-settler unit 100. There may be sufficient space for organic particles 137 to move between shielded front edge 334 and third plate 322 upward towards the larger organic layer. Due to the separated flow stream 34 having first interacted with shielded front edge 334 prior to separating for the first time into organic particles 137 and aqueous solution 139, separated flow stream 34 may move at a slow velocity. This slow velocity of flow stream 34 may encourage organic particles 137 to separate more easily within secondary flow distributor 212.

During operation of mixer-settler unit 100, separated flow stream 34 may move unilaterally towards secondary flow distributor 212. The interaction between separated flow stream 34 and third plate 322 may cause separated flow stream 34 to separate organic particles 137 from aqueous solution 139. Being less dense than aqueous solution 139, organic particles 137 may float upward between shielded front edge 334 and third plate 322 into a larger organic layer. Organic particles 137 may be prevented from rejoining aqueous solution 139 by secondary flow distributor 212 comprising third plate 322, second plate 318 and first plate 314. The space in which separated flow stream 42 may flow beneath secondary flow distributor 212 may be relatively uninterrupted, which may increase the velocity of separated flow stream 42. Therefore, tertiary flow distributor 215 may comprise a wider space for larger organic particles 137 to float upward to join the larger organic layer.

In various example embodiments, tertiary flow distributor 215 may comprise weir 326. During operation of mixer-settler unit 100, separated flow stream 42 may move unilaterally towards tertiary flow distributor 215. Second plate 318 may slope upwards and encourage organic particles 137 to move upwards to weir 326. Any remaining organic particles that have not already separated during the first separation step 30 and the second separation step 38 may float upward through weir 326 and empty into organic launder tank 341. After passing tertiary flow distributor 215, separated flow stream 50 may comprise aqueous solution 139. Separated flow stream 50 may also comprise remaining organic particles 137.

In various example embodiments, and with continued reference to FIG. 3B, mixer-settler unit 100 may comprise a further quaternary flow distributor comprising leading edge 330 coupled in a substantially perpendicular manner to weir 326. With further reference to FIGS. 1-3A, separated flow stream 50 may hit organic launder tank 341 and move upward past leading edge 330 between weir 326 and organic launder tank 341. Any remaining organic particles 137 may exit into organic launder tank 341. Separated flow stream 50 may next move unilaterally through post-flow distributor area 343. Post-flow distributor area 343 may be underneath organic launder tank 341. Separated flow stream 50 may move through post-flow distributor area 343 upwards through a tertiary weir 345. Tertiary weir 345 may empty into aqueous launder 54. However, it should be appreciated that separated flow stream 50 may empty into any location appropriate for the hydrometallurgical recovery process.

Thus, the flow distributor of the present disclosure provides means to separate organic particles 137 and aqueous solution 139 from one another within flow stream 26 as it progresses through mixer-settler unit 100. The flow distributor of the present disclosure beneficially decreases the flow rate of flow stream 26 and creates multiple ways for organic particles 137 to separate and float upward to the larger organic layer. This prevents impurities in the electrowinning process after the leaching process and increases the purity of the copper cathode. Additionally, cost savings may be realized through less waste of organic material, as well as other costs associated with extracting metal from ore.

EXAMPLES

Figure 4:
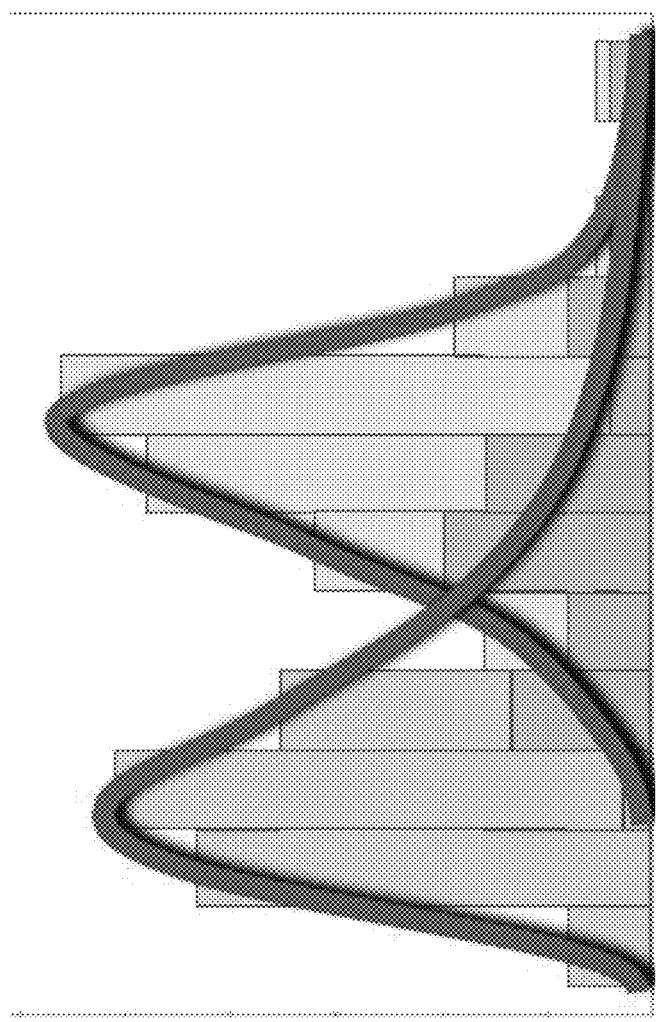
FIG. 4 illustrates experimental results of a histogram of exemplary entrainment values.

FIG. 4 shows the graphical analysis of the following example, which illustrates a histogram of the percentage measured on the y-axis against parts per million on the x-axis in increments of 5 parts per million. Exemplary entrainment values were obtained using a settler system in accordance with various embodiments of the invention. This example is merely illustrative, and it is not intended that the invention be limited to the example. Systems in accordance with the present invention may include the flow distributor below as well as additional and/or alternative flow distributor(s).

Two mixer-settlers were set up to monitor the parts per million of organic particles entrained in the aqueous flow stream, one with the flow distributor and one control mixer-settler without the flow distributor. As each cell operated, the amount of organic phase entrained in the aqueous flow stream was recorded. The collection method was over-the-weir entrainment measurement with milk bottles. Organic phase was collected before and after installation of the flow distributor. The control recorded an average organic entrainment of 32.8 parts per million. The mixer-settler with the flow distributor added recorded an average organic entrainment of 25.6 parts per million. This is a reduction of 7.2 parts per million, which is a 22 percent reduction in organic entrainment. If used for an entire year in the size of mixer-settlers as was used in the example, this would result in approximately $500,000 in savings per year, after calculating based upon the percentage volumes needed for reagent and the cost per gallon of reagent.

FIG. 5 shows further graphical analysis of the above example's measurement of average organic entrainment measured in parts per million on the y-axis over time on the x-axis, wherein the average organic entrainment in parts per million is compared between a control mixer-settler without the flow distributor installed, versus a mixer-settler with the flow distributor installed. The graph shows a difference of 7.2 parts per million. This example is merely illustrative, and it is not intended that the invention be limited to the example.

FIG. 6 shows further graphical analysis of the above example as an s-curve distribution comparison before and after installation of the flow distributor. The cumulative portion of the data set in percentage increments on the y-axis is measured against average organic entrainment in parts per million on the x-axis, with increments of 5 parts per million. This example is merely illustrative, and it is not intended that the invention be limited to the example.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

The invention claimed is:

1. A method for separating a liquid from organic particles, comprising:
   introducing a mixture of at least one liquid in combination with organic particles into an inbound portion of a vessel comprising the inbound portion and an outbound portion, wherein the mixture comprises a first phase and a second phase;
   separating the liquid from the organic particles by passing the mixture through a chevron-shaped coupled plate comprising a first plate coupled to a second plate, and a second plate coupled to a third plate having an end with a square edge surface, wherein the first plate coupled to a first support structure is configured to be substantially parallel to the first support structure, wherein a leading edge coupled to a weir is configured to be spaced from the first plate and have an end surface facing in an upstream direction, wherein the weir coupled to the first support structure is configured to be substantially parallel to the first support structure and perpendicular to the leading edge, wherein the flow of the mixture passes initially from the third plate, second plate and first plate sequentially to the weir, wherein both (i) the square edge surface of the third plate and (ii) a flow opening to the weir created by the coupling of the first and second plates being spaced from the leading edge are configured to cause the organic particles to separate from the liquid, wherein the first and third plates extend at a different angles from the second plate.

2. The method of claim 1, wherein the at least one liquid in the mixture comprises a metal.

3. The method of claim 2, wherein the metal is copper.

4. The method of claim 1, wherein the leading edge is spaced below the first plate.

5. The method of claim 1, wherein the angle formed by the first plate coupled to the second plate is configured to be above the leading edge.

6. The method of claim 1, wherein the end of the third plate with the square edge surface is not coupled to the second plate.

7. The method of claim 1, wherein the end of the weir that is not coupled to the leading edge has a square edge surface.

8. The method of claim 1, wherein the coupling of the first plate to the first support structure, the second plate to the first plate, the third plate to the second plate, and the weir to the leading edge are welded together.

9. The method of claim 8, wherein the second plate coupled to the third plate comprises a substantially chevron-shaped configuration; wherein the apex of the chevron is where the second plate is welded to the third plate.

10. The method of claim 8, wherein a shielded front edge is coupled to a second support structure.

11. The method of claim 10, wherein the shielded front edge comprises a fourth plate, and fifth plate, and a sixth plate; wherein the fourth plate is coupled to the fifth plate, and the fifth plate is coupled to the sixth plate, all at substantially perpendicular angles.

12. The method of claim 11, wherein the end of the third plate with a square edge surface is configured to lie approximately halfway between a middle portion of the fourth plate and sixth plate coupled to the fifth plate comprising the shielded front edge.

13. The method of claim 12, wherein the second plate coupled to the third plate comprises a substantially inverted chevron-shaped configuration; wherein the apex of the chevron is where the second plate is welded to the third plate.

14. The method of claim 11, wherein an end of the first plate having a square edge surface is parallel to an end of the weir having a square edge surface.

15. A method for separating a liquid from organic particles, comprising:

introducing a mixture of at least one liquid in combination with organic particles into an inbound portion of a vessel comprising the inbound portion and an outbound portion, wherein the mixture comprises a first phase and a second phase;

producing a first aqueous solution and a first organic particle layer by passing the mixture through a chevron-shaped coupled plate comprising a first plate coupled to a second plate, and a second plate coupled to a third plate having an end with a square edge surface, wherein the first plate coupled to a first support structure is configured to be substantially parallel to the first support structure, wherein a leading edge coupled to a weir is configured to be spaced from the first plate and have an end surface facing in an upstream direction, wherein the weir coupled to the first support structure is configured to be substantially parallel to the first support structure and perpendicular to the leading edge, wherein the flow of the mixture passes initially from the third plate, second plate and first plate sequentially to the weir, wherein both (i) the square edge surface of the third plate and (ii) a flow opening to the weir created by the coupling of the first and second plates being spaced from the leading edge are configured to cause the organic particles to separate from the liquid, wherein the first and third plates extend at a different angles from the second plate; and producing a second aqueous solution and a second organic layer by passing the first aqueous solution through a second weir that is spaced downstream from the first weir and configured to be substantially parallel to the first weir, wherein the space between the first weir and the second weir is configured to cause the organic particles to separate from the liquid.

16. The method of claim 15, wherein the leading edge is spaced below the first plate.

17. The method of claim 15, wherein the angle formed by the first plate coupled to the second plate is configured to be above the leading edge.

18. The method of claim 15, further comprising producing a third aqueous solution by passing the second aqueous solution through a third weir that is spaced downstream from the second weir and configured to be substantially parallel to the second weir, wherein the second aqueous solution flows through the third weir into an aqueous launder.

* * * * *